United States Patent [19]
Kimura

[11] 3,784,833
[45] Jan. 8, 1974

[54] APPARATUS FOR DERIVING DIFFRACTIVE RAYS BY DIFFRACTION GRATINGS

[75] Inventor: Katsuhiko Kimura, Tokyo, Japan

[73] Assignee: Olympus Optical Co., Ltd., Tokyo-to, Japan

[22] Filed: July 11, 1972

[21] Appl. No.: 270,688

[30] Foreign Application Priority Data
July 17, 1971 Japan.............................. 46/73584

[52] U.S. Cl.............. 250/237 G, 356/169, 250/234
[51] Int. Cl. ............................................. H01j 39/02
[58] Field of Search............ 250/237 G, 216, 231 R, 250/234; 356/169, 170

[56] References Cited
UNITED STATES PATENTS

| | | | |
|---|---|---|---|
| 3,114,046 | 12/1963 | Cabaniss et al................ | 250/237 G |
| 3,154,688 | 10/1964 | Shepherd........................ | 250/237 G |
| 2,964,636 | 12/1960 | Cary ............................... | 250/216 X |
| 3,668,404 | 6/1972 | Lehovec ......................... | 250/237 G |
| 3,569,997 | 3/1971 | Lehovec ......................... | 250/237 G |

Primary Examiner—Walter Stolwein
Attorney—John W. Malley et al.

[57] ABSTRACT

Apparatus for deriving diffractive rays by diffraction gratings which enables light measurement to be effected with high accuracy in addition to the feasibility of making the whole apparatus in a compact size. These features of the apparatus are obtained by the provision of a photoelectric element on the rear side of an index grating at a position in which it faces a movable scale grating with a small distance from this latter grating.

1 Claim, 3 Drawing Figures

PATENTED JAN 8 1974

3,784,833

3,784,833

APPARATUS FOR DERIVING DIFFRACTIVE RAYS BY DIFFRACTION GRATINGS

BACKGROUND OF THE INVENTION

1. Field of the invention

The present invention pertains to an apparatus for deriving diffractive rays by diffraction gratings.

2. Description of the prior art

It is known that precise and exact length or angle can be measured by either observing the positional changes of the moire-image interference fringes caused by the movement of one of the two separate transparent gratings or by metering the light rays representing such positional changes. In performing such a measurement, there arises no problem in case these two gratings are spaced apart from each other at a relatively great distance. However, in case this distance is decreased to the order of the wavelength of light rays, there develops the phenomenon of diffraction of rays. This phenomenon, in turn, gives rise to a considerable lowering contrast of the moire-image interference fringes, making it difficult to take the exact measurement under such condition. In order to intensify the contrast of moire-image interference fringes, therefore, it has been the practice to use an arrangement as shown in FIG. 1. More specifically, the light rays coming from a light source 1 impinge onto a scale grating 3 through a collimator lens 2. The light rays emitting from an index grating 4 are received by a photoelectric element 7 via a projection lens 5 and a slit 6.

With the foregoing arrangement of the apparatus, however, it has been difficult to produce this apparatus as a whole in a compact size and at a low cost.

SUMMARY OF THE INVENTION

It is, therefore, an object of the present invention to provide an apparatus for deriving diffractive rays by diffraction gratings, which is of an arrangement enabling the apparatus as a whole to be made in a compact size and at a low cost.

Another object of the present invention is to provide an apparatus for deriving diffractive rays by diffraction gratings which is simple in structure and which enables the diffractive rays to be derived with accuracy.

DESCRIPTION OF THE PREFERRED EMBODIMENTS

Figure 1:
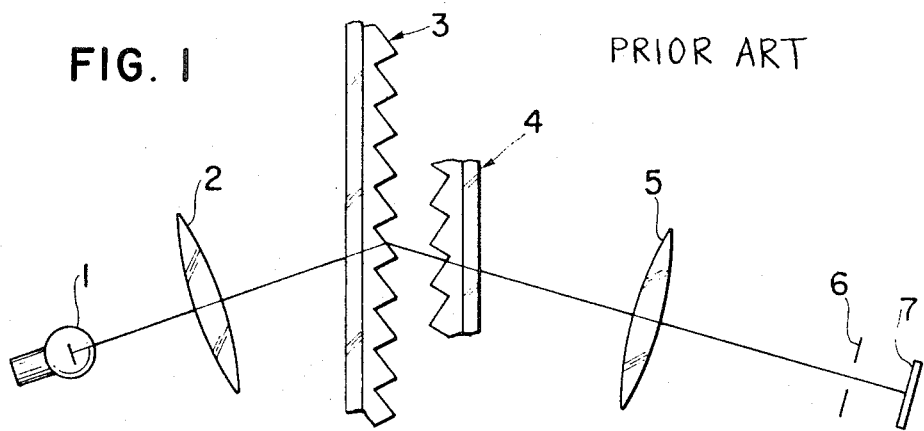
FIG. 1 is an illustration showing the arrangement of the essential parts of a known apparatus for deriving diffractive rays by diffraction gratings.
Figure 2:
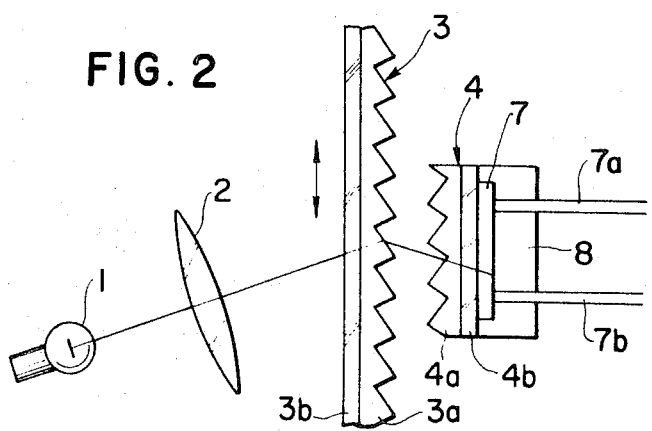
FIG. 2 is an illustration showing an example of the arrangement of the essential parts of the apparatus for deriving diffractive rays by diffraction gratings which embodies the present invention.

In FIG. 2, reference numeral 1 represents a light source which is installed at a fixed position. Numeral 2 represents a collimator lens for rendering the light rays from the light source 1 to parallel rays. Numeral 3 represents a scale grating which is comprised of a grating member 3a made with a replica of a synthetic resin and a thin planar glass sheet 3b securely attached to the rear side of said grating member 3a to serve as the base of this grating member. This scale grating 3 is arranged so that it is able to make a precise and exact movement in the direction of the arrow by means of a device not shown. Numeral 4 represents an index grating which is comprised of a grating member 4a made with a replica of a synthetic resin and a thin planar glass sheet 4b securely attached to the rear side of said grating member 4a to serve as the base of this grating member. This index grating 4 is arranged at a fixed position in such a way as to face said scale grating 3 at a small distance therefrom. Numeral 7 represents a photoelectric element such as SPD and having terminals 7a and 7b and being fixed directly to the rear side of the index grating 4 by an appropriate fixing means 8.

The apparatus according to the present invention is of the foregoing arrangement. The light rays coming from the light source 1 pass through the collimator lens 2 and impinge onto the scale grating 3. The light rays which are thus transmitted through the scale grating 3 will then impinge onto the index grating 4. Then, the light rays emitting from this index grating 4 will reach the light-receiving surface of the photoelectric element 7. As such, when the scale grating 3 is moved in the direction of the arrow, the moire-image interference fringes which are produced on the light-receiving surface of this photoelectric element 7 will move accordingly. Thus, it is possible to derive the amount of movement of the scale grating 3 as the change in the electric amount such as current or voltage. It should be understood, however, that by arranging the apparatus so that the scale grating 3 is fixed and that the index grating 4 together with the photoelectric element 7 is moved in the direction of the arrow, there is obtained a result equal to that described above.

Figure 3:
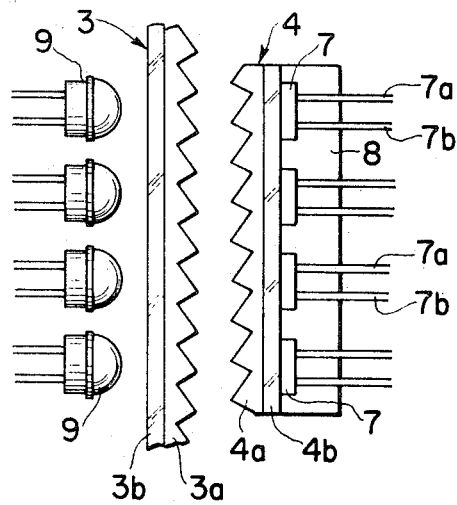
FIG. 3 is an illustration showing another example of the arrangement according to the present invention.

FIG. 3 shows another example of the apparatus embodying the present invention. In this example, there are provided as the light source a plurality of luminous diodes 9 which are arranged behind the scale grating 3 along therewith. Also, a plurality of photoelectric elements 7 are arranged on the rear surface of the index grating 4. According to this arrangement of the apparatus shown in FIG. 3, it is possible to produce the apparatus in a more compact size as compared with the one shown in FIG. 2.

I claim:

1. An apparatus for deriving diffractive rays by diffraction gratings, comprising a movable scale grating arranged in the foreground of a light source, said source including a plurality of luminous diodes arranged along said scale grating immediately adjacent thereto, an index grating fixed at a small distance from said scale grating and facing the latter grating, and a plurality of photoelectric elements arranged immediately behind said index grating and integrally fixed to the rear side thereof, said apparatus being arranged to be operative so that the light rays coming from said light source impinge directly onto said scale grating and that the light rays emitting from said index grating are received by said photoelectric elements.

* * * * *